US008746653B2

(12) United States Patent
Kellner et al.

(10) Patent No.: US 8,746,653 B2
(45) Date of Patent: Jun. 10, 2014

(54) WINDING BODY FOR A MAGNETIC ASSEMBLY OF A SOLENOID VALVE AND METHOD FOR WINDING A WINDING WIRE ONTO A WINDING BODY

(75) Inventors: Bernd Kellner, Waltenhofen (DE); Ernst Lorenz, Blaichach (DE); Martin Haas, Oberstenfeld (DE); Wolfgang Mailaender, Hemmingen (DE); Ruediger Prumbs, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 13/394,797

(22) PCT Filed: Jul. 15, 2010

(86) PCT No.: PCT/EP2010/060180

§ 371 (c)(1),
(2), (4) Date: Jun. 4, 2012

(87) PCT Pub. No.: WO2011/029644

PCT Pub. Date: Mar. 17, 2011

(65) Prior Publication Data

US 2012/0228534 A1 Sep. 13, 2012

(30) Foreign Application Priority Data

Sep. 9, 2009 (DE) ........................ 10 2009 029 298

(51) Int. Cl.
*F16K 31/02* (2006.01)

(52) U.S. Cl.
USPC ...... 251/129.15; 439/395; 439/398; 439/400; 439/406; 439/649; 336/192

(58) Field of Classification Search
USPC ............. 251/129.15; 439/395, 396, 398, 400, 439/406, 417, 425, 649, 650; 336/185, 192, 336/198, 208; 335/282; 242/432.6; 303/119.2
See application file for complete search history.

(56) References Cited

U.S. PATENT DOCUMENTS 4,166,265 A * 8/1979 Reynolds et al. ............. 336/192
(Continued)

FOREIGN PATENT DOCUMENTS

DE 100 14 738 A1 10/2001
(Continued)

OTHER PUBLICATIONS

International Search Report corresponding to PCT Application No. PCT/EP2010/060180, mailed Oct. 14, 2010 (German and English language document) (7 pages).

*Primary Examiner* — John K Fristoe, Jr.
*Assistant Examiner* — Matthew W Jellett
(74) *Attorney, Agent, or Firm* — Maginot, Moore & Beck

(57) ABSTRACT

A winding body for a magnetic assembly of a solenoid valve is disclosed, which comprises a base body, onto which a winding wire is wound, and two electrical connection domes, each of which has a first clamping gap with a first width, into which the winding wire wound onto the base body is inserted, wherein each of the winding wire ends rests on a contact surface of a wire support, which, in the direction of the corresponding winding wire end, is arranged behind the first clamping gap, and to a corresponding magnetic assembly, and to a corresponding solenoid valve comprising such a winding body, and to a corresponding method for winding the winding wire onto the winding body according to the disclosure. In order to receive the corresponding winding wire end, in the region of the contact surface of the wire support, a second clamping gap with a minimal second width is arranged behind the first clamping gap, the width being smaller than the first width of the first clamping gap. The minimum second width of the second clamping gap is adjusted to a diameter of the winding wire such that the corresponding winding wire end is fixed in the second clamping gap.

10 Claims, 2 Drawing Sheets

(56) References Cited

U.S. PATENT DOCUMENTS

| | | | | |
|---|---|---|---|---|
| 4,672,348 | A * | 6/1987 | Duve | 336/192 |
| 5,774,036 | A * | 6/1998 | Hrytzak et al. | 336/192 |
| 6,010,362 | A * | 1/2000 | Caviness et al. | 439/567 |
| 6,219,903 | B1 * | 4/2001 | Osterhart et al. | 29/602.1 |
| 6,369,682 | B1 * | 4/2002 | Thompson et al. | 336/192 |
| 8,193,890 | B2 * | 6/2012 | Gonzalez Romero et al. | 336/180 |
| 8,337,263 | B2 * | 12/2012 | Freakes | 439/877 |
| 2009/0201114 | A1 * | 8/2009 | Hasenour et al. | 336/192 |

FOREIGN PATENT DOCUMENTS

| | | | |
|---|---|---|---|
| DE | 696 18 197 | T2 | 7/2002 |
| DE | 10 2007 039 344 | A1 | 2/2009 |
| EP | 1 143 597 | A1 | 10/2001 |
| TW | 504718 | B | 10/2002 |
| WO | 2009/024399 | A1 | 2/2009 |

* cited by examiner

WINDING BODY FOR A MAGNETIC ASSEMBLY OF A SOLENOID VALVE AND METHOD FOR WINDING A WINDING WIRE ONTO A WINDING BODY

This application is a 35 U.S.C. §371 National Stage Application of PCT/EP2010/060180, filed on Jul. 15, 2010, which claims the benefit of priority to Ser. No. DE 10 2009 029 298.5, filed on Sep. 9, 2009 in Germany, the disclosures of which are incorporated herein by reference in their entirety.

BACKGROUND

The disclosure relates to a winding body for a magnetic assembly of a solenoid valve and to a method for winding a winding wire onto a winding body, and also to a magnetic assembly and to a solenoid valve having a winding body of this kind.

Solenoid valves are used for pressure modulation in modern brake systems and in driver assistance systems which comprise, for example, an anti-lock brake system (ABS), a traction control system (ASR system) or an electronic stability program system (ESP system). These solenoid valves are roughly made up of a valve cartridge which is caulked into a fluid unit, and a magnetic assembly which is generally located in an associated control device. The magnetic assembly is actuated with electrical actuation signals in order to generate a corresponding magnetic field, with the magnetic assembly comprising a wire winding which is wound onto a winding support and has a predefined number of turns, a covering disk and a housing jacket. In this case, the covering disk, as a component of the iron circuit, is pressed into the housing jacket in order to close the iron circuit of the magnetic assembly.

Laid-open specification DE 10 2007 039 344 A1 describes a method and an arrangement for winding a winding wire onto a winding body, and an associated magnetic assembly of a solenoid valve. According to the described method, a winding wire start is threaded into a first wire receiving slot in a first electrical connection dome. A predefinable number of turns is then wound onto the winding body and, after the winding process, a winding wire end is threaded into a second wire receiving slot in a second electrical connection dome, and cut. The winding wire start which is threaded into the first wire receiving slot is placed on a first wire support which is arranged behind the wire receiving slot, with the winding wire being shaped and retained before the winding process such that the diameter of the winding wire is increased in the direction of the width of the first wire receiving slot in a region which rests on the first wire support, and therefore the winding wire start is prevented from slipping back into the first wire receiving slot. The winding wire end which is threaded into the second wire receiving slot is placed on a second wire support which is arranged behind the second wire receiving slot, with the winding wire being shaped and cut after the winding process such that the diameter of the winding wire is increased in the direction of the width of the second wire receiving slot in a region which rests on the second wire support and the winding wire end is prevented from slipping back into the second wire receiving slot. The described method requires a particular winding arrangement with special shaping tools for the winding wire start and the winding wire end.

DISCLOSURE OF THE INVENTION

In contrast, the winding body according to the disclosure for a magnetic assembly of a solenoid valve having the features set forth below has the advantage that a second clamping gap of a minimal second width is arranged in the region of a contact surface of the wire support in order to receive a corresponding winding wire end behind a first clamping gap, said width being smaller than the first width of the first clamping gap. In this case, the minimal second width of the second clamping gap is matched to a diameter of the winding wire such that the corresponding winding wire end is fixed in the second clamping gap. The winding body according to the disclosure for a magnetic assembly of a solenoid valve comprises a base body, a first electrical connection dome having a first clamping gap into which a winding wire end is inserted, and a second electrical connection dome having a first clamping gap into which the other winding wire end is inserted. The first connection dome and the second connection dome are designed, for example, as a plastic injection-molded part and each have a wire support which is arranged behind the first clamping gap in the direction of the respective winding wire end.

The winding body according to the disclosure can be used, for example, in a corresponding magnetic assembly and in a solenoid valve having a magnetic assembly of this kind.

In contrast, the method according to the disclosure for winding a winding wire onto a winding body having the features set forth below has the advantage that the winding wire which is inserted into a first clamping gap in a first connection dome is additionally placed on a second clamping gap, which is arranged in front of the first clamping gap in the direction of the wire, and, during the cutting process, pressed into the second clamping gap by a wire cutting tool until it comes to rest on a contact surface of a wire support, and fixed in said second clamping gap, with the winding wire being cut by the wire cutting tool when it rests on the contact surface. By virtue of the method according to the disclosure, the winding wire is inserted into the first clamping gap in the first electrical connection dome and cut. A predefinable number of turns are then wound onto the winding body and, after the winding process, the winding wire is inserted into a first clamping gap in a second electrical connection dome and cut.

By virtue of the second clamping gap, embodiments of the disclosure advantageously prevent the corresponding winding wire end slipping back into the first clamping gap in the electrical connection dome during the winding process and/or in the event of subsequent assembly processes and/or in the event of the wound winding body being handled. The second clamping gap executes a reliable wire retaining function until contact is made, and therefore the process reliability is advantageously improved, and the degree of clamping of the first clamping gap in the electrical connection dome is no longer safety-critical. In addition, the second clamping gap provides a virtually constant wire retaining force irrespective of the existing tolerance situation of the first clamping gap width and the wire diameter, and therefore the two winding wire ends are fixed in the corresponding second clamping gaps when the wound winding body is handled and when the magnetic assembly is used as intended and, as a result, are retained in the first clamping gaps in the electrical connection domes in order to be able to establish an optimum electrical connection, for example with an insulation-displacement connector. As a result, it is advantageously possible to use the magnetic assembly to generate a desired magnetic field in a manner controlled by a corresponding control device. In addition, waste produced during the production of the winding bodies and/or the magnetic assemblies can be reduced by virtue of embodiments of the disclosure.

Advantageous improvements to the winding body which is specified in independent patent claim 1 for a magnetic assembly of a solenoid valve and to the method which is specified in independent patent claim 9 for winding a winding wire onto a winding body are possible by virtue of the measures and developments discussed in the dependent claims.

It is particularly advantageous for two wire clamping blocks which are spaced apart from one another to be arranged on the contact surface of the wire support, the spacing between said clamping blocks forming the second clamping gap. By way of example, the two wire clamping blocks are designed such that the spacing between the two wire clamping blocks, and therefore the second clamping gap, tapers from an initial width to the minimal second width along its length. As a result, fixing of the winding wire can advantageously be ensured irrespective of the production tolerances of the winding wire. The taper along the length of the second clamping gap corresponds to approximately 10 to 20%, preferably 15%, of the initial width.

In a refinement of the winding body according to the disclosure, the initial width of the second clamping gap corresponds to the first width of the first clamping gap. As a result, the second clamping gap can be formed to directly merge with the first clamping gap.

In a further refinement of the winding body according to the disclosure, the wire clamping blocks are designed such that the spacing between the two wire clamping blocks, and therefore the second clamping gap, tapers along its height at least in a starting region. This can facilitate the insertion process and preliminary fixing of the winding wire before the cutting process.

In a refinement of the method according to the disclosure, the winding wire which is inserted into the first clamping gap in the second connection dome after the winding process is additionally placed on a second clamping gap, which is arranged behind the first clamping gap in the direction of the wire, and, during the cutting process, pressed into the second clamping gap by a wire cutting tool until it comes to rest on a contact surface of a wire support, and fixed in said second clamping gap, with the winding wire being cut by the wire cutting tool when it rests on the contact surface. The wire cutting tool is designed such that the shapes of the winding wire ends remain substantially unchanged, as a result of which winding without any residual wire can advantageously be ensured. This means that the winding wire end remaining in the wire guide of the winding machine is not bent and therefore can be used as the winding wire start of the next winding body for the next winding process.

Advantageous embodiments of the disclosure are illustrated in the drawings and will be described below. In the drawings, identical reference symbols denote components and elements which execute the same or similar functions.

DETAILED DESCRIPTION

Figure 1:
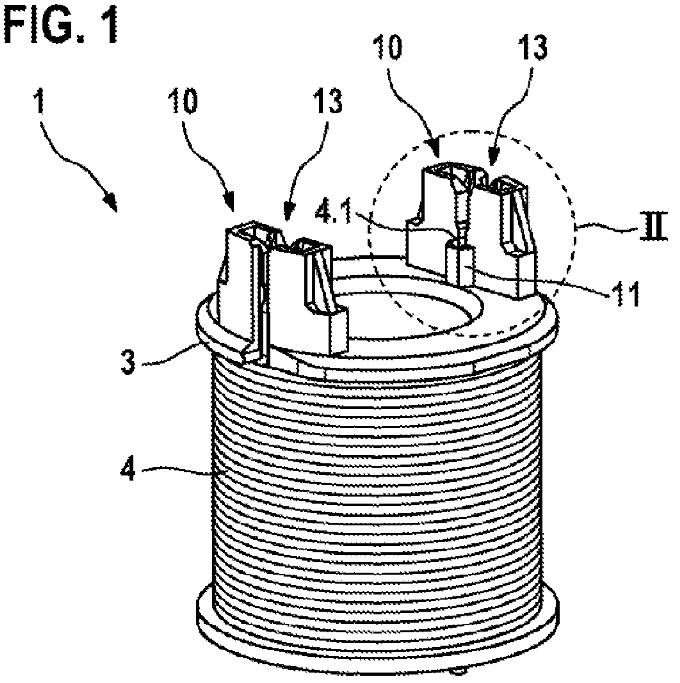
FIG. 1 shows a perspective illustration of an exemplary embodiment of a winding body according to the disclosure for a magnetic assembly of a solenoid valve.

For the winding process in which a winding wire is wound onto a base body of a winding body, the prior art discloses a winding method which uses so-called residual-wire-free winding. In this case, the winding wire is not fixed by an auxiliary pin but rather by means of additional clamping when the winding body is changed over. That is to say, a winding wire end of a preceding magnetic assembly can be used as the start of the following magnetic assembly. In this case, the winding wire is fixed in the winding body by means of being clamped into a first clamping gap in an electrical connection dome which is part of the winding body. The clamping gap is designed to be connected to the winding wire as an insulation-displacement connection. Since the electrical connection dome is designed as a plastic injection-molded part, it is difficult to comply with the required tolerance for the clamping gap width in injection molding. In addition, process influences following the injection molding, such as shrinkage and water absorption, generally cannot be taken into consideration for the component dimensions. Therefore, the winding wire may slip back out of the wire receiving slot, for example as a result of being pressed too weakly into the clamping gap during the cutting process on the winding machine, or during the following assembly processes, such as bulk goods, transportation etc. and during handling of the wound winding body. In the event of excessive clamping, the winding wire may, for example, not completely rest in the region of a wire support and drift upward. This can lead to incorrect positioning of the winding wire with the contact-making region no longer being accessible to the cutting blade or, under certain circumstances, lying outside the contact-making zone in the region of the cutting blade lug. In addition, possible excessive backward movement of the winding wire may result in contact between the winding wire and the housing jacket of the magnetic assembly. On account of vibrations which occur in the event of field loading, this can lead to the insulation of the winding wire being severed and, as a result, to a short circuit and therefore also to malfunctioning of the magnetic assembly. These problems can be prevented by virtue of embodiments of the disclosure which will be described below with reference to FIGS. 1 to 4.

As shown in FIGS. 1 to 4, the illustrated exemplary embodiment of a winding body 1 according to the disclosure for a magnetic assembly of a solenoid valve comprises a base body 3, onto which a winding wire 4 is wound, and two electrical connection domes 10 which each have a first clamping gap 12 of a first width B1 into which a winding wire 4 which is wound onto the base body 3 is inserted, with the winding wire ends 4.1 each resting on a contact surface 11.1 of a wire support 11 which is arranged behind the first clamping gap 12 in the direction of the corresponding winding wire end 4.1. According to the disclosure, a second clamping gap 11.3 of a minimal second width B2 is arranged in the region of the contact surface 11.1 of the wire support 11 in order to receive the corresponding winding wire end 4.1 behind the first clamping gap 12, said width B2 being smaller than the first width B1 of the first clamping gap 12. The minimal second width B2 of the second clamping gap 11.3 is matched to a diameter of the winding wire 4 such that the corresponding winding wire end 4.1 is fixed in the second clamping gap 11.3. The electrical connection domes 10 are designed, for example, as plastic injection-molded parts.

Figure 2:
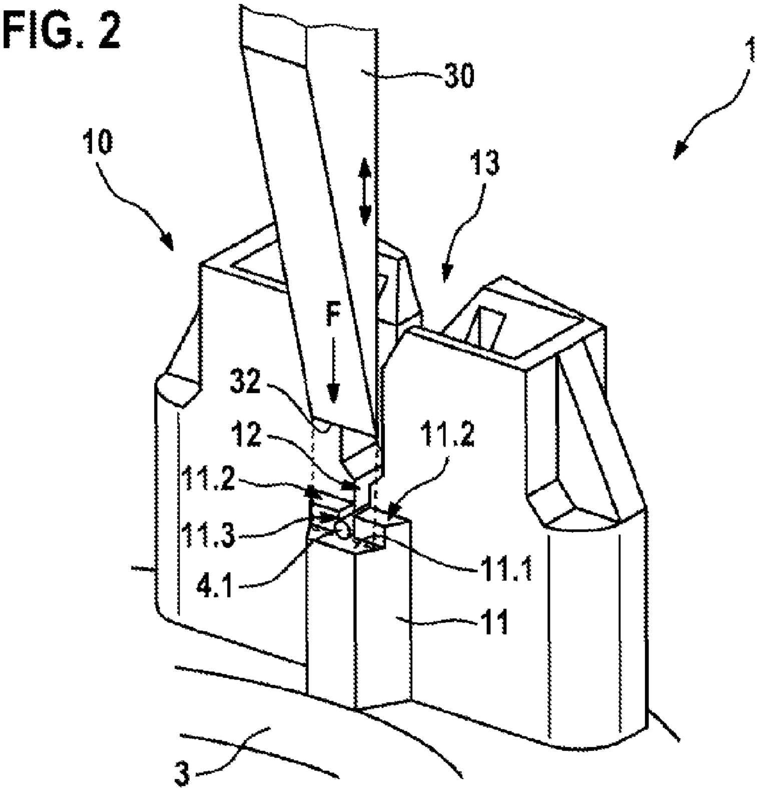
FIG. 2 shows a perspective illustration of a detail of an electrical connection dome of the winding body from FIG. 1.
Figure 3:
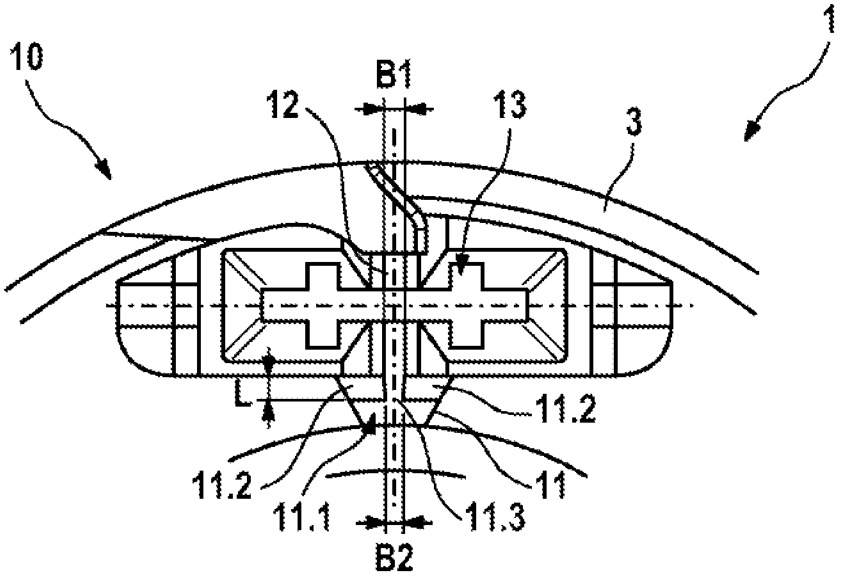
FIG. 3 shows a schematic plan view of the connection dome from FIG. 2.
Figure 4:
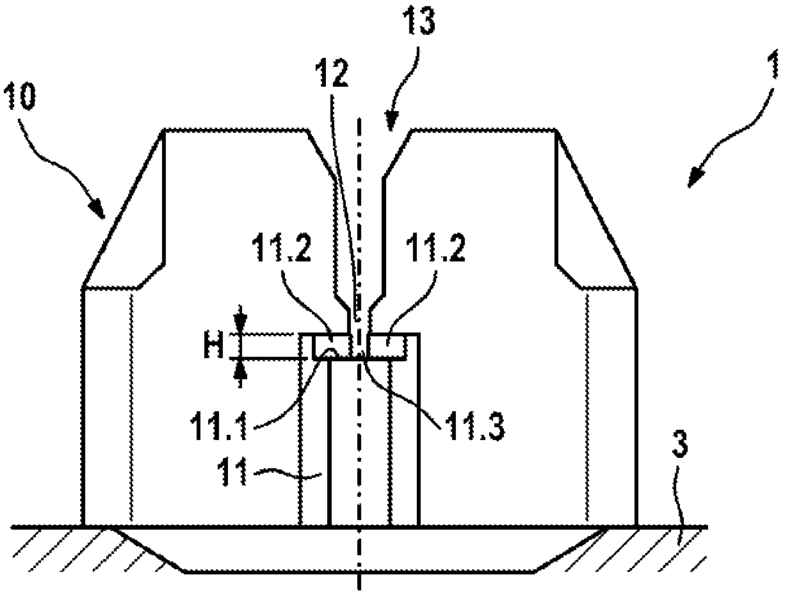
FIG. 4 shows a schematic side view of the connection dome from FIGS. 2 and 3.

As also shown in FIGS. 2 to 4 in particular, two wire clamping blocks 11.2 which are spaced apart from one another are arranged on the contact surface 11.1 of the wire support 11, the spacing between said clamping blocks forming the second clamping gap 11.3. The two wire clamping blocks 11.2 are arranged such that the spacing between the two wire clamping blocks 11.2, and therefore the second clamping gap 11.3, tapers from an initial width B1 to the minimal second width B2 along its length L, with the initial width of the second clamping gap 11.3 corresponding to the first width B1 of the first clamping gap 12. The taper along the length L of the second clamping gap 11.3 corresponds to approximately 10 to 20%, preferably 15%, of the initial width B1 of the first clamping gap 12. In addition, the spacing between the two wire clamping blocks 11.2, and therefore the second clamping gap 11.3, tapers along its height H at least in a starting region in the illustrated exemplary embodiment. This means that each wire clamping block 11.2 has a kind of "insertion bevel" for the winding wire 4 in order to facilitate placement and insertion of the winding wire 4 into the second clamping gap 11.3.

According to an embodiment of the method for winding the winding wire 4 onto a winding body 1 according to the disclosure, the winding wire 4 is inserted into the first clamping gap 12 in a first electrical connection dome 10 and at the same time placed on the second clamping gap 11.3 which is arranged in front of the first clamping gap 12 in the direction of the wire or inserted as far into said second clamping gap as allowed by the width of the second clamping gap 11.3 and a diameter of the winding wire 4. The winding wire is then cut by a wire cutting tool 30 having a cutting edge 32. During the cutting process, the winding wire 4 is pressed into the second clamping gap 11.3 by a force F, which is generated by the wire cutting tool 30, until said wire comes to rest on a contact surface 11.1 of the wire support 11, and fixed in said second clamping gap. In the process, the winding wire 4 is cut by the cutting edge 32 of the wire cutting tool 30 only when it rests on the contact surface 11. A predefinable number of turns are then wound onto the base body 3 of the winding body 1. During the winding process and after the winding process, the corresponding winding wire end 4.1 is retained in the second clamping gap 11.3 by the fixing, as a result of which the winding wire end 4.1 is prevented from slipping back into the first clamping gap 12. After the winding process, the winding wire 4 is inserted into the first clamping gap 12 in a second electrical connection dome 10 and at the same time placed on a second clamping gap 11.3 which is arranged behind the first clamping gap 12 in the direction of the wire or inserted as far into said second clamping gap as allowed by the width of the second clamping gap 11.3 and a diameter of the winding wire 4. The winding wire 4 is then cut by the cutting edge 32 of the wire cutting tool 30. In this cutting process too, the winding wire 4 is pressed into the second clamping gap 11.3 by the force F, which is generated by the wire cutting tool 30, until said wire comes to rest on the contact surface 11.1 of the wire support 11 of the second electrical connection dome 10, and fixed in said second clamping gap. In the process, the winding wire 4 is cut by the cutting edge 32 of the wire cutting tool 30 only when it rests on the contact surface 11.

By virtue of the two cutting processes, the respective winding wire end 4.1 is fixed in the second clamping gap 11.3 and arranged in the first clamping gap 12 such that problem-free electrical contact can be made between the corresponding winding wire end 4.1 and an insulation-displacement connector (not illustrated) which is inserted into an insulation-displacement receiving means 13 of the corresponding electrical connection dome 10 in order to establish an insulation-displacement connection to the respective winding wire end 4.1.

The clamping of the winding wire 4 in the second clamping gap 11.3 in the first electrical connection dome 10 has to absorb and withstand both the clamping forces of the winding wire 4 and also the tensile forces during the winding process. The design according to the disclosure of the second clamping gap 11.3 facilitates this. In addition, the cross section of the corresponding winding wire end 4.1 is deformed to a lesser extent in comparison with the conventional winding methods since the second clamping gap 11.3 prevents the winding wire 4 from slipping back into the first clamping gap 12 without a shaping process of the winding wire 4. In addition, the design according to the disclosure of the second clamping gap 11.3 prevents the winding wire end remaining in the winding machine from being damaged or deformed during cutting by virtue of the winding wire end 4.1 being fixed before the actual cutting. This ensures winding without residual wires, and this means that the wire end remaining in the wire guide of the winding machine is not bent and can therefore be used as the winding wire start 4.1 of the next winding support 3 for the next winding process.

Embodiments of the disclosure can be designed such that winding wires 4 of different diameters can be wound onto the base body 3 of the winding body 1 according to the method according to the disclosure. As a result, magnetic assemblies which generate different magnetic forces can be produced with the same winding body 1. The second clamping gap 11.3 of the respective electrical connection dome 10 can be designed, for example, such that a plurality of different wire diameters, including the insulation coating, can be fixed in the second clamping gap 11.3.

By virtue of the second clamping gap, embodiments of the disclosure can advantageously prevent winding wire ends from slipping back into the first clamping gaps in the electrical connection domes during the winding processes, during the cutting processes, during subsequent assembly processes and/or during handling of the wound winding body. This advantageously increases the process reliability, with the width of the first clamping gap no longer being safety-critical for the production of the insulation-displacement connection in the electrical connection dome.

The invention claimed is:

1. A winding body for a magnetic assembly of a solenoid valve, comprising:

a base body;

a winding wire wound on the base body having a first end and a second end;

a first electrical connection dome including (i) a first clamping gap having a first width into which the winding wire is inserted, (ii) a first wire support having a first contact surface, and (iii) a second clamping gap arranged in a region of the first contact surface, the second clamping gap having a minimal second width, which is less than the first width, the first end of the winding wire being configured to rest on a the first contact surface of the first wire support, and the first wire support being arranged on an opposite side of the first clamping gap from the first end of the winding wire; and a second electrical connection dome including (i) a third clamping gap having the first width into which the winding wire is inserted, (ii) a second wire support having a second contact surface, and (iii) a fourth clamping gap arranged in a region of the second contact surface, the fourth clamping gap having the minimal second width, the second end of the winding wire being configured to rest on the second contact surface of the second wire support, and the second wire support being arranged on an opposite side of the third clamping gap from the second end of the winding wire, wherein the minimal second width of the second and fourth clamping gaps is substantially equal to a diameter of the winding wire such that the first end of the winding wire is fixed in the second clamping gap and the second end of the winding wire is fixed in the fourth clamping gap.

2. The winding body as claimed in claim 1, further comprising:

a first pair of wire clamping blocks, which are spaced apart from one another, arranged on the first contact surface of the first wire support, such that a first spacing between the first pair of wire clamping blocks defines the second clamping gap; and a second pair of wire clamping blocks, which are spaced apart from one another, arranged on the second contact surface of the second wire support such that a second spacing between the second pair of wire clamping blocks defines the fourth clamping gap.

3. A winding body for a magnetic assembly of a solenoid valve, comprising:

a base body, a winding wire wound on the base body, and two electrical connection domes which each have a first clamping gap of a first width into which the winding wire is inserted, with each end of the winding wire resting on a contact surface of a wire support which is arranged behind the first clamping gap in the direction of the corresponding end of the winding wire, wherein a second clamping gap of a minimal second width is arranged in the region of the contact surface of the wire support in order to receive the corresponding end of the winding wire behind the first clamping gap, said width being smaller than the first width of the first clamping gap, with the minimal second width of the second clamping gap being matched to a diameter of the winding wire such that the corresponding end of the winding wire is fixed in the second clamping gap, wherein two wire clamping blocks which are spaced apart from one another are arranged on the contact surface of the wire support, the spacing between said clamping blocks forming the second clamping gap, and wherein the spacing between the two wire clamping blocks, and therefore the second clamping gap, tapers from an initial width to the minimal second width along its length.

4. The winding body as claimed in claim 3, wherein the taper along the length of the second clamping gap corresponds to approximately 10 to 20% of the initial width.

5. The winding body as claimed in claim 3, wherein the initial width of the second clamping gap corresponds to the first width of the first clamping gap.

6. The winding body as claimed in claim 2, wherein the spacing between the two wire clamping blocks, and therefore the second clamping gap, tapers along its height at least in a starting region.

7. The winding body as claimed in claim 1, wherein the minimal second width of the second and fourth clamping gaps is matched to a diameter of the winding wire such that the first end of the winding wire is fixed in the second clamping gap and the second end of the winding wire is fixed in the fourth clamping gap.

8. A solenoid valve for a motor vehicle, comprising:

a magnetic assembly having a winding body, the winding body including:

a base body, a winding wire wound on the base body, and a first electrical connection dome including (i) a first clamping gap having a first width into which the winding wire is inserted, (ii) a first wire support having a first contact surface, and (iii) a second clamping gap arranged in a region of the first contact surface, the second clamping gap having a minimal second width, which is less than the first width, the first end of the winding wire being configured to rest on the first contact surface of the first wire support, and the first wire support being arranged on an opposite side of the first clamping gap from the first end of the winding wire, and a second electrical connection dome including (i) a third clamping gap having the first width into which the winding wire is inserted, (ii) a second wire support having a second contact surface, and (iii) a fourth clamping gap arranged in a region of the second contact surface, the fourth clamping gap having the minimal second width, the second end of the winding wire being configured to rest on the second contact surface of the second wire support, and the second wire support being arranged on an opposite side of the third clamping gap from the second end of the winding wire, wherein the minimal second width of the second and fourth clamping gaps is substantially equal to a diameter of the winding wire such that the first end of the winding wire is fixed in the second clamping gap and the second end of the winding wire is fixed in the fourth clamping gap.

9. A method for winding a winding wire onto a winding body, comprising:

inserting the winding wire into a first clamping gap in a first electrical connection dome;

placing the winding wire on a second clamping gap in the first electrical connection dome:

pressing the winding wire into the second clamping gap with a wire cutting tool until the winding wire rests against a first contact surface of a first wire support and the winding wire is fixed in the second clamping gap;

cutting the winding wire to define a first wire end by using the wire cutting tool to cut through the winding wire resting against the first contact surface;

after cutting the winding wire, winding a predefinable number of turns onto the winding body;

after winding the winding wire, inserting the winding wire into a third clamping gap in a second electrical connection dome; and cutting the winding wire in the third clamping gap.

10. The method as claimed in claim 9, the cutting of the winding wire inserted in the third clamping gap further comprising:

placing the winding wire on a fourth clamping gap pressing the winding wire into the fourth clamping gap with the wire cutting tool until the winding wire rests against a second contact surface of a second wire support and the winding wire is fixed in said fourth clamping gap, and cutting the winding wire to define a second wire end pressing by using the wire cutting tool to cut through the winding wire resting against the second contact surface.

* * * * *

UNITED STATES PATENT AND TRADEMARK OFFICE

CERTIFICATE OF CORRECTION

PATENT NO. : 8,746,653 B2
APPLICATION NO. : 13/394797
DATED : June 10, 2014
INVENTOR(S) : Bernd Kellner et al.

It is certified that error appears in the above-identified patent and that said Letters Patent is hereby corrected as shown below:

In the Specification

Column 6, line 48, the word “a” should be deleted from the phrase “winding wire being configured to rest on a the first” so that the phrase instead reads “winding wire being configured to rest on the first”.

Column 7, line 5, the “,” should be deleted from the phrase “the first wire support, such that a first spacing between” so that the phrase instead reads “the first wire support such that a first spacing between”.

Column 8, line 35, the “:” at the end of the phrase “first electrical connection dome:” should be a “;” so that the phrase instead reads “first electrical connection dome;”.

Signed and Sealed this
Second Day of June, 2015

Michelle K. Lee
*Director of the United States Patent and Trademark Office*